US012254599B2

(12) United States Patent
Stec et al.

(10) Patent No.: US 12,254,599 B2
(45) Date of Patent: Mar. 18, 2025

(54) SYSTEM FOR GENERATING MOTION BLUR

(71) Applicant: FotoNation Limited, Galway (IE)

(72) Inventors: Piotr Stec, Galway (IE); Petronel Bigioi, Galway (IE)

(73) Assignee: Tobii Technlologies Limited, Ballybrit (IE)

( * ) Notice: Subject to any disclaimer, the term of this patent is extended or adjusted under 35 U.S.C. 154(b) by 106 days.

(21) Appl. No.: 18/305,384

(22) Filed: Apr. 24, 2023

(65) Prior Publication Data

US 2024/0354897 A1 Oct. 24, 2024

(51) Int. Cl.
*G06T 5/50* (2006.01)
*G06T 5/70* (2024.01)
(Continued)

(52) U.S. Cl.
CPC ............. *G06T 5/50* (2013.01); *G06T 5/70* (2024.01); *G06T 7/248* (2017.01); *H04N 5/2624* (2013.01);
(Continued)

(58) Field of Classification Search
CPC .. G06T 5/50; G06T 5/70; G06T 7/248; G06T 2207/10016; G06T 2207/10144;
(Continued)

(56) References Cited

U.S. PATENT DOCUMENTS 9,836,831 B1 * 12/2017 Krishnaswamy ......... G06T 5/70
10,600,189 B1 * 3/2020 Bedikian ................... G06T 7/73
(Continued)

FOREIGN PATENT DOCUMENTS

EP 3440833 B1 8/2019
WO 2016173794 A1 11/2016
(Continued)

OTHER PUBLICATIONS

Willert, Christian & Klinner, Joachim, "Event-based Imaging 20 Velocimetry—An Assessment of Event-based Cameras for the Measurement of Fluid Flows", https://arxiv.org/pdf/2202.11178.pdf, 2022, 18 pages.
(Continued)

*Primary Examiner* — Timothy J Henn
(74) *Attorney, Agent, or Firm* — Noréns Patentbyrå AB

(57) ABSTRACT

A system for generating motion blur comprises: a frame camera, an event camera and an accumulator for accumulating event information from a plurality of events occurring within a window around the exposure time of an image frame in a plurality of event frames. A processor determines from the events in at least a first of the plurality of event frames, one or more areas of movement within the field of view of the event camera; determines from the events in at least a second of the plurality of event frames, a direction of movement for the one or more areas of movement; and applies blur in one or more areas of the image frame corresponding to the one or more determined areas of movement in accordance with at least the direction of movement for each of the one or more areas of movement to produce a blurred image.

8 Claims, 6 Drawing Sheets

(51) Int. Cl.
*G06T 7/246* (2017.01)
*H04N 5/262* (2006.01)
*H04N 25/47* (2023.01)

(52) U.S. Cl.
CPC ... *H04N 25/47* (2023.01); *G06T 2207/10016* (2013.01); *G06T 2207/10144* (2013.01); *G06T 2207/20081* (2013.01); *G06T 2207/20084* (2013.01); *G06T 2207/20212* (2013.01)

(58) Field of Classification Search
CPC . G06T 2207/20081; G06T 2207/20084; G06T 2207/20212; G06T 7/215; G06T 2207/20182; G06T 5/60; H04N 5/2624; H04N 25/47
See application file for complete search history.

(56) References Cited

U.S. PATENT DOCUMENTS

| | | | |
|---|---|---|---|
| 11,405,580 | B2 | 8/2022 | Bartha et al. |
| 2019/0279378 | A1* | 9/2019 | Takahashi ............... G06T 7/223 |
| 2020/0265590 | A1* | 8/2020 | Daniilidis ............... G06T 7/269 |
| 2021/0042939 | A1* | 2/2021 | Xiong ..................... G06T 7/246 |
| 2021/0343029 | A1 | 11/2021 | Toca et al. |
| 2023/0230212 | A1* | 7/2023 | García Capel ............ G06T 5/00 382/100 |
| 2024/0233310 | A1* | 7/2024 | Yamaguchi ............. G06T 7/254 |
| 2024/0273735 | A1* | 8/2024 | Wang ..................... G06T 7/246 |

FOREIGN PATENT DOCUMENTS

| | | |
|---|---|---|
| WO | 2019042703 A1 | 3/2019 |
| WO | 2019145516 A1 | 8/2019 |
| WO | 2019180033 A1 | 9/2019 |

OTHER PUBLICATIONS

Posch, C, Serrano-Gotarredona, T., Linares-Barranco, B., & Delbruck, T. "Retinomorphicevent-based vision sensors: bioinspired cameras with spiking output", Proceedings of the IEEE, 100(10), 1470-1484, (2014), 14 pages.

Inivation,Davis 346, https://inivation.com/wp-content/uploads/2019/08/DAVIS346.pdf, Aug. 15, 2019, 4 pages.

* cited by examiner

SYSTEM FOR GENERATING MOTION BLUR

FIELD OF THE INVENTION

The present invention relates to a system for generating motion blur.

BACKGROUND

A characteristic cinematic quality of video sequences filmed with a professional movie camera is partially achieved by filming at 24 frames-per-second, fps, with an exposure time of half the frame interval. Capturing video sequences in this manner ensures fluid continuity between frames, while correct frame exposure is controlled by the combination of a lens aperture and/or neutral-density (ND) filters.

On mobile devices, such a visual effect is difficult to achieve, as the small lens assemblies of these devices typically do not incorporate a mechanical aperture or interchangeable filters. As such, frame exposure can only be controlled by adjusting exposure time and/or sensor gain. So, while a 24 fps frame rate is easily achievable on mobile devices, in good lighting conditions the exposure time must be lowered to well below the half the frame interval. This can lead to choppy and discontinued motion in scenes with moving objects, so undermining the cinematic look of a video sequence recorded with such devices.

In general in the art, it has been desirable to attempt to avoid or mitigate the effects of motion blur in video sequences, in some cases using information from event cameras, for example, as disclosed in Willert, Christian & Klinner, Joachim, "Event-based Imaging Velocimetry—An Assessment of Event-based Cameras for the Measurement of Fluid Flows", https://arxiv.org/pdf/2202.11178.pdf, 2022.

Nonetheless, it is known to add motion blur to a video sequence, such as disclosed in PCT Application WO 2016/173794 (Ref: FN-461-PCT).

It is an object of the present invention to provide a better simulation of the long frame exposure times employed by cinematographic cameras, using image frames captured with a shorter exposure time.

SUMMARY

According to the present invention, there is provided a system for generating motion blur according to claim 1.

Embodiments use an image frame acquired with a short exposure time in combination with events from an event camera, in order to simulate an image frame captured with a longer exposure time.

Embodiments of the invention can be employed as part of frame rate conversion of an image sequence acquired by a frame camera to either a higher or lower frame rate sequence. For example, an image camera could capture a video sequence at 60 fps and 0.5 ms exposure time, and event information could be used to effectively convert such a sequence to 24 fps and 21 ms exposure time.

Because of the high temporal resolution and high sensitivity of event cameras, methods according to the present invention can capture motion of very thin objects that other methods may have trouble dealing with.

Embodiments of the present invention can mitigate the effects of temporal aliasing by using event information occurring in a window around a frame short exposure time to correctly blur the frame taking into account movement with a scene being imaged.

In further aspects, there is provided a method according to claim 7 and a non-transient computer program product comprising computer readable instructions stored on a computer readable medium which when executed on a processor of a computing device are configured to perform the method.

BRIEF DESCRIPTION OF THE DRAWINGS

Embodiments of the invention will now be described, by way of example, with reference to the accompanying drawings, in which.

DESCRIPTION OF THE EMBODIMENTS

Figure 1:
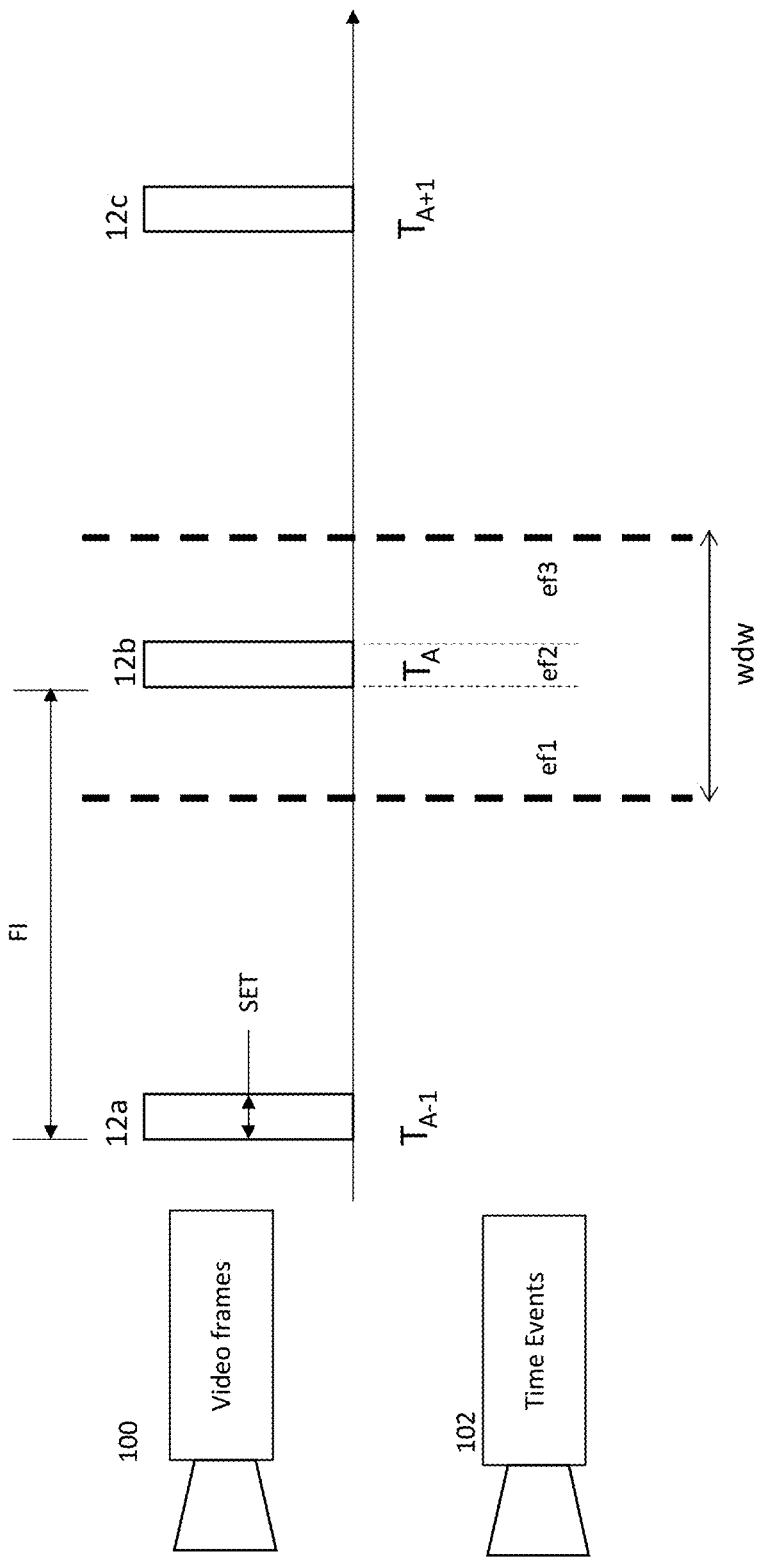
FIG. 1 shows an exemplary timeline illustrating the temporal relationships between event and image frames employed in a first embodiment of the present invention.

Referring now to FIG. 1, a system for simulating blur according to an embodiment of the present invention comprises a frame-based camera 100 which produces a video sequence including image frames 12a, 12b, 12c at times $T_{A-1}$, $T_A$ and $T_{A+1}$ respectively, typically at rates of between about 25 but possibly up to 240 frames-per-second (fps). At 25 fps, each frame occupies a frame interval, FI, of 40 ms with the frame interval shortening as frame rate increases. It will be appreciated that the frame rate can vary over time, but the frame rate is maximally limited by a minimal frame interval for a given exposure time for a frame or set of frames. While, in some contexts or environmental conditions, frame rate may be limited, for example, by a longer required exposure time, in general as mentioned above, for a digital camera the exposure time for a frame comprises only a fraction of a frame interval.

In general, the data acquired and provided by the camera 100 to the remainder of the system comprises a frame of information spanning the entire field of view of the camera 100 regardless of any activity within the field of view.

Typically, the frame-based camera 100 is sensitive to visible wavelengths and produces polychromatic image information in any one of a number of suitable formats including RGB, YUV, LCC or LAB formats. However, it will be appreciated that the camera 100 may alternatively produce monochromatic, intensity only, frame information or the camera may in the alternative or in addition be sensitive to other wavelengths, such as infra-red or near infra-red or indeed the camera may be hyperspectral producing colour plane information for multiple wavelength bands.

The system further comprises an event camera 102 providing event information across a field of view overlapping the field of view of the frame-based camera 100. In various embodiments, the event camera 102 may have the same or a different resolution than the frame-based camera. The event camera 102 can be, for example, of the type disclosed in Posch, C, Serrano-Gotarredona, T., Linares-Barranco, B., & Delbruck, T. "Retinomorphic event-based vision sensors: bioinspired cameras with spiking output", Proceedings of the IEEE, 100 (10), 1470-1484, (2014), European Patent No. EP3440833, PCT Application WO2019/145516 and PCT Application WO2019/180033 from Prophesee. Such cameras are based on asynchronously outputting image information from individual pixels whenever a change in pixel value exceeds a certain threshold—an event. Thus, pixels in the event camera 102 report asynchronous event streams of intensity changes, characterised by x, y location, timestamp and polarity of intensity change.

In other embodiments of the invention, the frame camera 100 and event camera 102 can be integrated into a single device with a common field of view, as exemplified by the DAVIS 346 camera (https://inivation.com/wp-content/uploads/2019/08/DAVIS346.pdf).

In still further variants, sensors which count photons incident on each pixel, sometimes referred to as Quanta Image Sensors (QIS), could be employed. In such cases, pixels would send event information every time the accumulated charge for a pixel would reach another predetermined level, with image frames being generated periodically. Using such a sensor, no spatial resolution is lost in providing event and image frame information as in the DAVIS camera.

In any case, two types of representations of a given scene being imaged by the cameras 100 and 102 are provided as input to a method 20 for blurring each image frame produced by the camera 100. An instance of the method operating on the frame 12b acquired at time $T_A$ in FIG. 1 is described in more detail in relation to FIG. 2.

In step 200, the short-exposure time (SET) image frame 12b of FIG. 1, is acquired by the frame camera 100 at an exposure time $T_A$. As explained, such images tend to be sharp, in spite of potentially imaging objects in motion.

In step 202a, events occurring during the SET of the frame 12b are acquired by the event camera 102 and accumulated in an event frame ef2. An example of a module for accumulating such events in an event frame is disclosed in U.S. patent application Ser. No. 17/016,133 (FN-668-US), the disclosure of which is incorporated herein by reference. Nonetheless, event information can be accumulated in a number of ways including using sparse matrices and the term event frame is used in the present specification to cover all such implementations.

Separately, as indicated in step 202b, events are also accumulated during a longer window, wdw, including the short-exposure time (SET) of the image frame in an event frame ef3. The length of the window, wdw, is proportional and may, although not necessarily, be the same as a desired long-exposure time (LET) which the method is to simulate e.g., half the frame interval. The window is typically no longer than the frame interval—as this would mean that certain events could affect the blurring of more than one frame. The window is typically but not necessarily centered around the SET of the image frame, as this means that events occurring before and after the SET can be given equal weight. In any case, knowledge of the desired exposure time employed by a cinematographic camera whose output it is desired to simulate is useful in determining the width of the window, wdw.

A number of different methods may be employed in order to generate the two event frames ef2, ef3 provided by steps 202a, 202b. Where the SET is located within the window, wdw, event information from the beginning of the window until the beginning of the SET can be accumulated in a first event frame ef1. The event module can either clear its frame memory or continue to accumulate event information until the end of the SET. If the frame memory has not been cleared, the information from event frame ef1 can then be subtracted from the event frame ef2 to provide the required event frame information occurring during the SET. Again, the event module can either clear its frame memory or continue to accumulate event information until the end of the window to produce event frame ef3. If the frame memory has been cleared, then the event frame for step 202b can be provided by aggregating ef1, ef2 and ef3 with ef2 being directly available as the output of step 202a. If the frame memory has not been cleared, then the event frame ef3 for step 202b is directly available, whereas the event frame for step 202a is provided by subtracting ef1 from ef2.

Alternatively, where possible, ef2 and ef3 can be accumulated in parallel using any appropriate software are hardware receiving information from the event camera 102.

In step 204, the events captured during the frame short exposure time in step 202a are projected from the coordinate space of the event camera 102 to the coordinate space of the frame camera 100 by calculating the spatial relationship between the fields of view of both cameras. Where a device acting as both frame-based and event camera such as a DAVIS camera is used, no such calculation is required.

In step 206, noise and gaps may be removed from the event frame data using, for example, morphological operations including dilation, erosion, opening and/or closing. The result is an event frame where isolated event pixels are removed and where small holes within groups of pixels are filled.

In step 208, individual events within the event frame are clustered into a discrete number of contiguous areas. As movement detected by event cameras is typically detected along the edges of moving objects, such contiguous areas typically correspond with edges and are referred to as such below.

In step 210, for each contiguous area, the edge is then tracked over time to find the direction and extent of motion, using any corresponding edges detected in the analysis of one or both of frames 12a and 12c captured by the frame-based camera 100 at exposure times $T_{A-1}$ and $T_{A+1}$ respectively. Where a corresponding edge is detected in frames 12a, 12b and 12c of FIG. 1, then the respective coordinates of the edges in each of frames 12a, 12b and 12c indicate is there has been movement as well as the direction and extent of motion.

It will be appreciated that one or more of steps 206, 208, 210 can be performed before step 204 in the event camera coordinate space.

In variations of the above described implementation, rather than comparing event information acquired at $T_A$ with information acquired at $T_{A-1}$ and $T_{A+1}$, the direction and extent of motion can be determined by comparing event information acquired at $T_A$ and accumulated in ef2 with event information accumulated in one or both of ef2 and ef3 (excluding event information from ef1 and ef2).

Separately, in step 212, the events accumulated across the whole of the longer window, wdw, in event frame ef3 are projected to the image space in a similar way to step 204. The locations of events in the frame ef3 corresponds generally with the motion blur that would be produced within the window, wdw and so the width of the window is proportional to the blur which can be applied to the image frame 12b. Typically, the width of the window is chosen as equal to the exposure time of a longer exposure time cinematographic camera image the method is attempting to simulate.

Subsequently, in step 214, morphological operations can again be used to clean the events from noise and gaps to create a mask of pixel locations where blur is to be applied in the image frame 12b. So, while in such an embodiment, the pixel mask typically comprises a number of contiguous areas where blur is to applied, without step 214, the pixel mask would comprise a list, possibly filtered, of individual pixel locations where movement has been detected and where blur is to be applied.

Again, step 214 can be performed when required before step 212 in the event camera coordinate space.

In step 216, a blur kernel is calculated for each pixel in the mask created in steps 212, 214 using information from the tracking of the edges performed in steps 204-210. Thus, each pixel in the mask produced in steps 204-210 will be proximate at least one edge detected by steps 204-210. In a simple implementation, the direction and magnitude of movement determined for the closest edge to a pixel in the mask determines the blur kernel for this pixel. In more complicated implementations, the coefficients of the kernel can be weighted according to a distance between the pixel location and the location of the edge relation to the pixel location (whether the closest point of the edge or an edge centroid or representative location of the edge). Where more than one edge is proximate a pixel location within the mask, the direction and extent of motion for each edge can be interpolated to provide the required direction and extent of motion for a pixel and thus determine the coefficients of the blur kernel for the pixel.

Figure 2:
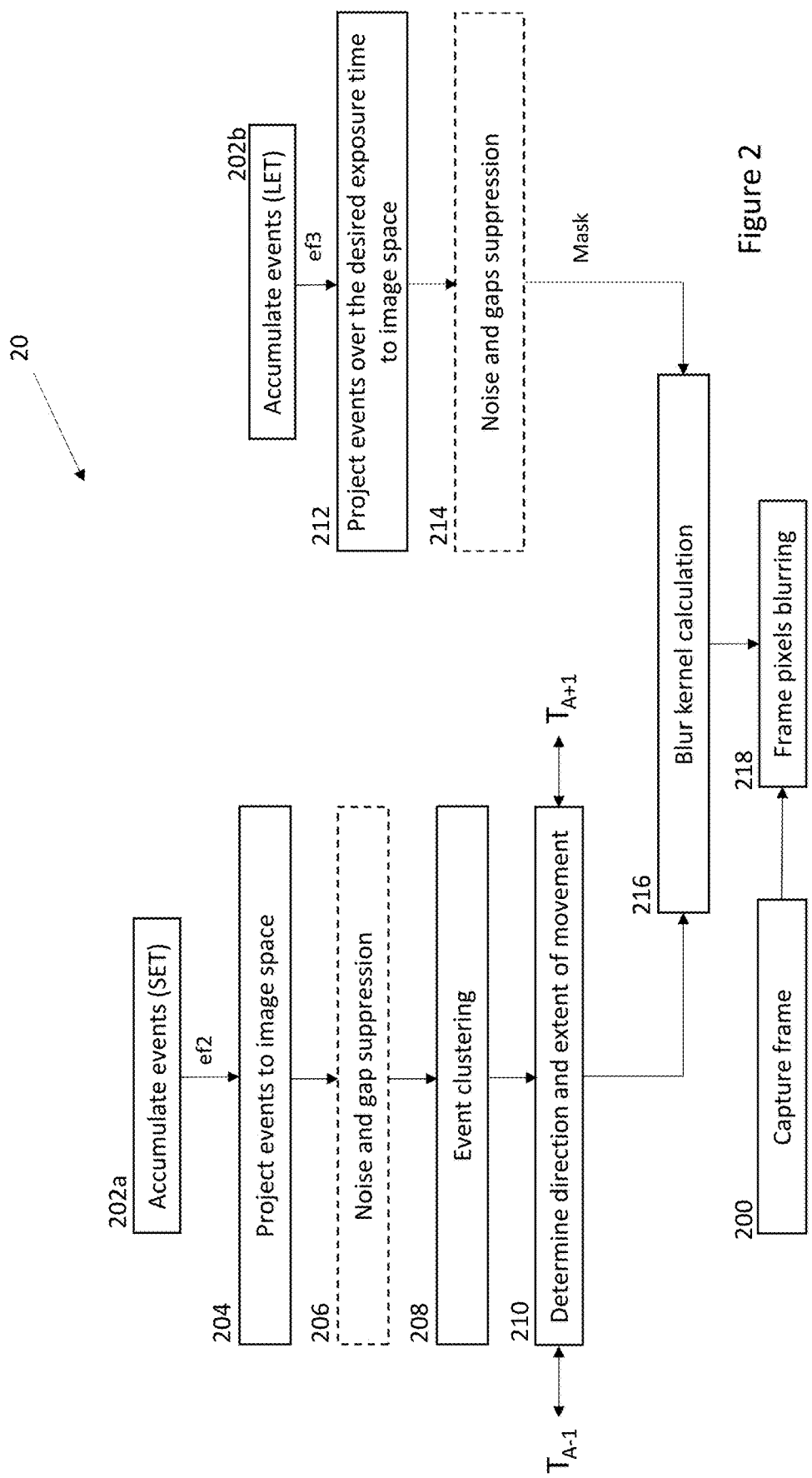
FIG. 2 shows a method according to the first embodiment of the present invention.

In FIG. 2, the kernel represents a point spread function for each pixel of the mask based on the trajectory specified by the events accumulated in respective event frames ef2 for each of frames 12a, 12b, 12c.

The kernel size can be dynamically adjusted based on the extent of motion calculated in step 210 or it can be set to a predetermined size. So, for example, when large frame-to-frame movement is detected between edges, a 5×5 blur kernel can be employed for a given pixel of the mask whereas when smaller movement is detected a 3×3 blur kernel can be employed. Similarly, the weight of the elements of the kernel can be dynamically adjusted based on the extent of movement calculated at step 210, but may also be set to a predetermined value. So, in a simple implementation, a pixel from the mask, may either be blurred or not, whereas in a more precise implementation, the magnitude of movement detected in the vicinity of a pixel of the mask at step 210 determines a magnitude of the blur kernel coefficients, with more diffuse blurring and so relatively higher value kernel peripheral coefficients for greater movement and vice versa.

In another alternative embodiment, the blur may be produced using only a determined direction of motion, and a given kernel used according to the determined direction.

In step 218, the blur kernel is then applied to the image frame pixels of the mask to produce a blurred image. As such, the blurring performed by the kernel takes into account the extent and direction of motion detected by the tracking of the edges from step 210.

It will be appreciated that steps 202 to 210 and 212-214 can be carried out in parallel, or alternatively step 212 and 214 can be carried out after the direction and extent of motion have been determined in step 210.

As mentioned above, events occurring within the window, wdw around the SET when the image frame can be used to determine the direction and extent of motion and thus the blur to be applied to pixels of an image frame where movement is detected and so where blur is to be applied.

While in the example of FIG. 2, such information is accumulated in frames ef1 and ef3, information from more or fewer event frames can be employed. Thus, a simple comparison between the event information in ef2 and ef1 could be used, or the event information could be divided into a greater number of frames to perhaps identify non-linear movement around the acquisition time of an image frame.

In any case, it should be noted that where the relative timing of event frames ef1 . . . ef3 and their respective images frames 12a . . . 12c is known, information from the event frames can be suitably weighted as required when determining the blur kernel for the pixels of each image frame to be blurred.

The principle described above can be extended for use not only in artificially adding blur to individual image frames, but in frame rate conversion of a video sequence. If conversion is performed from a higher frame rate video sequence to a lower rate, then higher rate frames could be combined and converted to lower rate frames (or some frames could simply be dropped) and then the lower rate sequence of frames blurred (with more blur than would be applied to the higher rate image frames), using the available information from the event camera as described above.

Equally, frame rate up-sampling is possible. In this case, a new sharp image frame can be generated by interpolating surrounding lower rate image frames and then the newly generated image frame blurred as described above. (This might involve applying less blur than for higher to lower frame rate down conversion.)

It will be appreciated that the blur kernel could be a 3D kernel instead of a 2D kernel, with added layers of the kernel for a given pixel being derived from neighbouring frames. Such an approach is facilitated in hardware using platforms for example as disclosed in PCT Application WO2019/042703 (Ref: FN-618-PCT), the disclosure of which is herein incorporated by reference. Thus, the kernels determined for a pixel in image frame 12a, 12b and 12c could be combined and weighted accordingly when applying blur to the pixel in image frame 12b. This could be particularly beneficial for use in frame rate down conversion and can also potentially improve occlusions created by overlapping objects.

The availability of event information in parallel with image frame information for a scene also allows for the possibility of accurate prediction of the location of an object that is moving with variable velocity and this information can be used for further manipulation of the images of a scene, in particular in the context of frame rate conversion.

Figure 3:
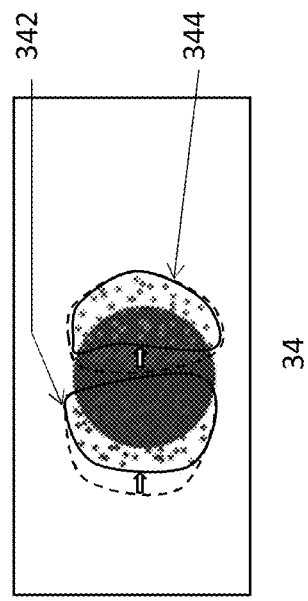
FIG. 3 illustrates the tracking of contiguous areas corresponding to moving objects employed in the embodiment of FIG. 2.
Figure 3:
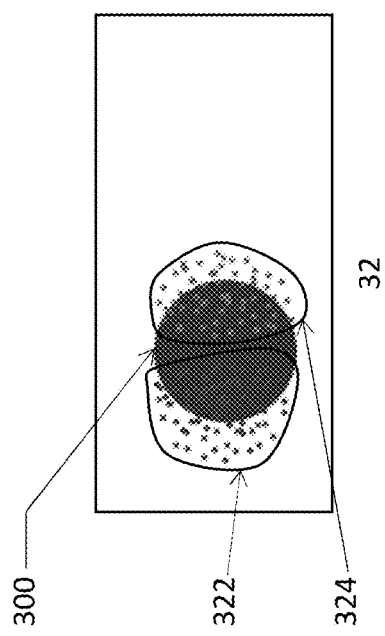

Referring now to FIG. 3, which illustrates an exemplary tracking of contiguous areas. In a first frame 32, there is provided a moving object 300. Accumulated events have been projected to the image frame and clustered in contiguous areas 322 and 324 respectively. In a subsequent frame 34, accumulated events characteristic of movement of the object 300 have been clustered in corresponding contiguous areas 342 and 344.

For illustrative purposes, the dashed lines correspond to the contiguous areas determined for frame 32, while the straight lines correspond to the contiguous areas determined for frame 34. It can be appreciated that the continuous edges of contiguous areas 342 and 344 are different than the edges of contiguous areas 322 and 324.

The direction and extent of movement associated with the object 300 can then be determined by tracking over time the position in the image frame of the edges of the contiguous areas, as illustrated in FIG. 3 by the two white arrows corresponding to the relative displacements of the calculated contiguous areas. In this example, it will be appreciated that the object 300 is moving from left to right when looking at the frames.

Figure 4:
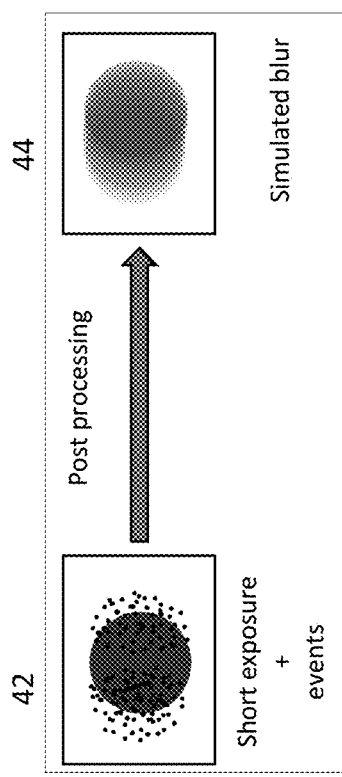
FIG. 4 shows an exemplary combination of a frame image and associated events to produce a blurred image according to an embodiment of the present invention.

Referring now to FIG. 4, there is provided an exemplary simulation of blurring according to the present invention. An initial image 42 of the moving object 300 first referred to in FIG. 3 is taken with a short exposure time, and a simulated blurred image 44 is produced. It will be appreciated that the blurring takes into account the direction and extent of the motion The above described embodiments involve an explicit algorithmic approach to employing event information acquired in a window around the exposure time of an acquired image frame for applying blur to the image. It will be appreciated that in variants of these embodiments, an implicit neural network based approach can be employed.

Figure 5:
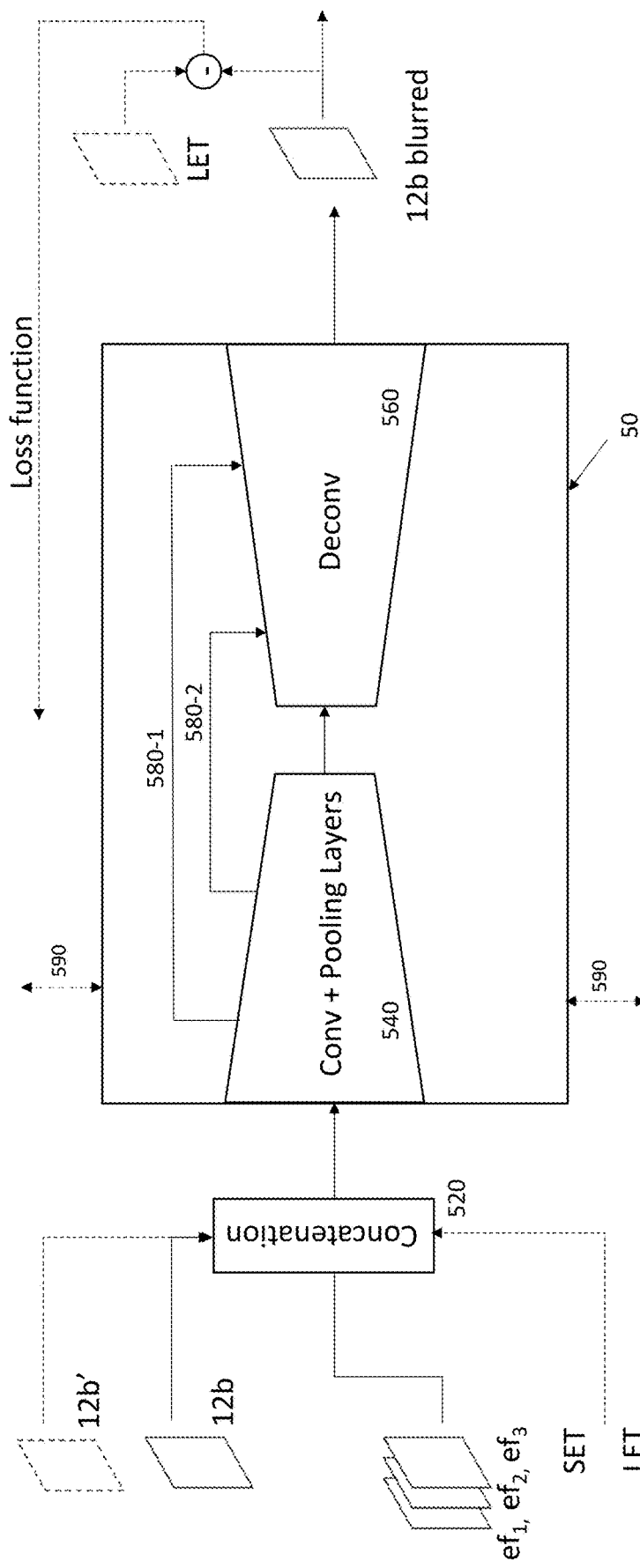
FIG. 5 illustrates an exemplary neural network implementation employed in a second embodiment of the present invention.

Referring now to FIG. 5, there is shown schematically an exemplary neural network 50 configured to perform blurring of an image frame according to an embodiment. In this case, a network input layer receives three sets of inputs: an image frame, for example, 12b captured by the frame-based camera 100; events accumulated in respective frames, for example, event frames ef1, ef2, ef3 corresponding to image frame 12b; as well as the short-exposure time (SET) of the image frame 12b and the desired long-exposure time (LET) for the simulated blurred image. In alternative embodiments, only frames ef1 and ef2 might be employed. In any case, in such implementations, the time over which events are accumulated in frames ef1, ef2 and ef3 is expanded and reduced in accordance with the amount of blur required.

In other embodiments event information might be divided into a greater fixed number of frames provided as inputs to the network 50. For example, consider an input and desired video sequence, each at 24 frames per second and with a maximum target exposure time of 20 ms, with a 180° shutter angle. In this case, 21 input frames could be defined with one comprising the SET image frame. The remaining inputs could be employed to accumulate events from successive 1 ms time windows around the acquisition time of the SET image. If the SET image frame is captured at time 0, then one event frame will contain events captured from time 0 ms to time+1 ms, the next will contain events from +1 ms to +2 ms and so on and similarly for negative times. The output exposure length can then be controlled by filling varying numbers of event frames. For example, to achieve 10 ms exposure, only 5 event frames for time slices before and 5 event frames for time slices after the start of SET image acquisition would be filled. This gives 1 ms granularity to the blurring applied to the image frame. It will be appreciated that the time range covered by each of such frames could vary and need not be regular.

In other embodiments, event frames ef2 determined when processing adjacent image frames 12a and 12c as well as the event frame ef2 determined for image frame 12b can be provided. So while in the embodiment of FIG. 5, the frame rate of the blurred image sequence is the same as the input image sequence, in some embodiments, the frame rate of the input video sequence can be reduced as mentioned above. In this case, multiple input image frames such as 12a, 12b and 12c and their surrounding event frames might be provided to produce a single blurred image. So, for example, the approach of FIG. 5 could be extended by interleaving event frames and image frames. For example, when converting 120 frames per second to 24 frames per second, the input frames for +8 ms and −8 ms relative to an instant image frame could contain image frames acquired from the camera 100 immediately before and after an instant image frame instead of event frames.

While not essential, it will be appreciated that providing the SET, LET exposure times enables the neural network 50 to train better, especially when LET information is available for ground truth samples used for training the network, as described in more detail below.

The frames 12b, ef1 . . . ef3 and exposure times SET, LET are aggregated. In a preferred embodiment, the frames and exposure times are concatenated 520; however, the frames and exposure times may alternatively be added, subtracted and/or combined in convolutional layers.

In FIG. 5, the inputs are shown as being provided in parallel to an initial concatenation layer 520, however, it will be appreciated that in alternative implementations, these could be provided to successive input layers. Note that where input information is used for multiple frames, then certain combinations can be pre-computed and re-used across multiple instances of the network, as described in US202/1343029 (Ref: FN-661-US), the disclosure of which is herein incorporated by reference.

In the intermediate layers of the network 50, the aggregated input is fed through successive encoding layers 540, typically comprising convolutional and pooling layers, followed by a decoder 560 typically comprising one or more deconvolutional and unpooling layers to restore the resolution of the output blurred image to that of the input image frame. Typically, in such networks, encoder and decoder layers are inter-connected with forward-skip connections 580-1, 580-2. However, in more complicated multi-stage implementations, residual interconnections or backward-skip connections can be employed. Nonetheless, it will be appreciated that the blurred output 58 may have a different resolution than the input frame 52 and for example could be either up-sampled or down-sampled relative to the input image.

Finally, it will be appreciated that implementations of the network may incorporate some form of memory function in the form of long-short term memory (LSTM) layers (not shown). Equally, other implementations may be singly or bi-directionally recurrent with hidden layer information being exchanged between successive instances of the network 50 through connections 590 as they process respective successive input images.

As will be appreciated, in order to train the network 50, a source of ground truth information needs to be obtained. Typically, this might involve imaging a given scene with the cameras 100, 102 and a separate cinematographic camera sharing a common field of view. A loss function is then used to compare the blurred output from the neural network 50 with the real blurred input from the cinematographic camera before adjusting the weights of the network accordingly until after a given number of training epochs, the loss is acceptable. The LET employed by the cinematographic camera can be exchanged automatically with the training platform and fed to the network 50 through meta-data incorporated in the ground truth video sequence or if known, it can be provided as a parameter to the network 50.

Figure 6:
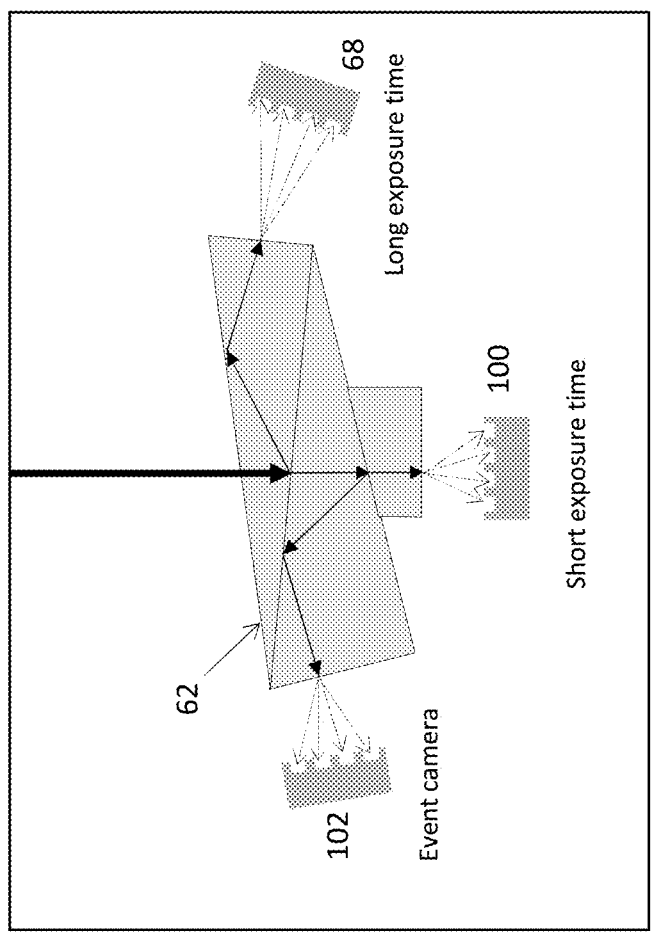
FIG. 6 shows an exemplary 3-way beam splitter, employed in training a neural network based embodiment of the present invention.

Referring now to FIG. 6, in order to ensure that each of the cameras 100, 102 and a cinematographic camera 68 share a common field of view, a 3-way beam splitter 62, similar to those used 3CCD cameras, can be employed. In a preferred embodiment, the incident light is split into three paths, one leading to the event camera 102, whereas the second frame camera 100 records image frames with short exposure times and the third cinematographic camera 68 records image frames with a long exposure time. The camera 68 may have a neutral density filter at the front of its sensor to allow for longer exposure times while keeping the gain and other parameters the same as for the frame camera 100. The trichroic prism is designed to work with a single lens, so eliminating parallax errors and matching the optical axes and geometry of the cameras in the system. The cameras are synchronised in the time domain with timestamps and exposure times recorded. Ideally, short exposure frames captured by the camera 100 are exposed in the middle of the long exposure frame window to minimise the distance of the target blur.

In other implementations, other types of beam splitters can be used, especially to tailor the target reflection to transmission ratio in order to provide more or less light to the photosensing arrays of each one of the cameras 100, 102 and 68 as required.

It will be appreciated that where an integrated frame-based and event camera is employed, the input beam needs only to be split between this camera and the cinematographic camera 68. In that configuration, the beam splitter could be any one of a two-prism assembly, a half-silvered mirror or any other type of beam splitter.

Nonetheless, in some embodiments, the acquisition of the video frames from cameras 100 and 68 and the events from the camera 102 may be realised using side-by-side cameras. Such an approach would require additional processing to perform geometrical registration between image frames and event frames, in order to compensate for alignment and parallax errors.

Still further variations of the above-described embodiments are possible. For example, it is known for frame cameras to acquire a stack of two or more short exposure time and longer exposure time image frames beginning at a given time and to combine these component images to create high dynamic range (HDR) image which takes into account illumination variations across a scene. It can be problematic however, to properly combine the component images for the HDR image in the presence of motion blur, in particular, because of the different exposure times of the component images being subject to different degrees of motion. In a particular implementation of the present invention, as well as a relatively sharper SET image frame, such as frame 12*b*, at least one LET image frame 12*b'* whose exposure includes the exposure time of the SET image frame 12*b* is also provided as an input to the network 50 of FIG. 5. This allows the network 50 to produce a HDR properly blurred version of the images 12*b*, 12*b'*.

This technique can be applied analogously to explicit algorithmic implementations of the invention such as described in relation to FIG. 2.

The invention claimed is:

1. A system for generating motion blur, the system comprising:
    a frame camera configured to provide an image frame at an exposure time covering a field of view of the frame camera;
    an event camera having a field of view overlapping the field of view of the frame camera and configured to provide event information for a plurality of events, each event indicating an x,y location within said field of view, a polarity for a change of detected light intensity incident at said x,y location and an event cycle at which said event occurred;
    an accumulator for accumulating event information from a plurality of events occurring within a window around the exposure time in a plurality of event frames, the event frames having a temporal relationship with one another; and
    a processor configured to:
        determine from the events in at least a first of said plurality of event frames, one or more areas of movement within the field of view of the event camera;
        determine from the events in at least a second of said plurality of event frames, a direction of movement for the one or more areas of movement; and
        apply blur in one or more areas of the image frame corresponding to the one or more determined areas of movement in accordance with at least the direction of movement for each of the one or more areas of movement to produce a blurred image, wherein applying blur further includes:
        filtering said events in said first of said plurality of event frames to provide a mask indicating said one or more areas of movement, and
        calculating a blur kernel for each pixel of the mask according to at least said determined direction of movement.

2. A system according to claim 1 wherein the processor is configured to determine from the events in at least the second event frame, an extent of movement for the one or more areas of movement; and to apply blur in the one or more areas of the image frame corresponding to the one or more determined areas of movement in accordance with the direction and the extent of movement for each of the one or more areas of movement.

3. The system of claim 1, wherein the processor is further configured to:
    compare the events in at least one of a second event frame for a previously acquired image and a successively acquired image to determine at least said direction of movement for the one or more areas of movement.

4. The system of claim 3, wherein the processor is further configured to:
    cluster the events in said second of said event frames into one or more contiguous areas; and
    track the relative movement of said one or more contiguous areas from at least one of the previously acquired image and the successively acquired image to determine at least said direction of movement for the one or more areas of movement.

5. The system of claim 1, wherein the processor is further configured to:
    compare the events in an event frame including events accumulated in said window before said exposure time of said image frame, the events in an event frame including events accumulated in said window after said exposure time of said image frame and said second of said event frames to determine at least said direction of movement for the one or more areas of movement.

6. The system of claim 1 wherein a frame rate of said frame camera is greater than a frame rate of said blurred image and wherein said processor is configured to combine a plurality of successive image frames to produce a given blurred image frame.

7. A method for generating motion blur comprising:

obtaining from a frame camera an image frame at an exposure time covering a field of view of the frame camera;

obtaining from an event camera, having a field of view overlapping the field of view of the frame camera, event information for a plurality of events, each event indicating an x,y location within said field of view, a polarity for a change of detected light intensity incident at said x,y location and an event cycle at which said event occurred;

accumulating event information from a plurality of events occurring within a window around the exposure time in a plurality of event frames, the event frames having a temporal relationship with one another;

determining from the events in at least a first of said plurality of event frames, one or more areas of movement within the field of view of the event camera;

determining from the events in at least a second of said plurality of event frames, a direction of movement for the one or more areas of movement; and applying blur in one or more areas of the image frame corresponding to the one or more determined areas of movement in accordance with at least the direction of movement for each of the one or more areas of movement to produce a blurred image, wherein applying blur further includes:

filtering said events in said first of said plurality of event frames to provide a mask indicating said one or more areas of movement, and calculating a blur kernel for each pixel of the mask according to at least said determined direction of movement.

8. A non-transient computer product comprising computer readable instructions stored on a computer readable medium which when executed on a processor of a computing device are configured to perform the method of claim 7.

* * * * *